Figure 1:
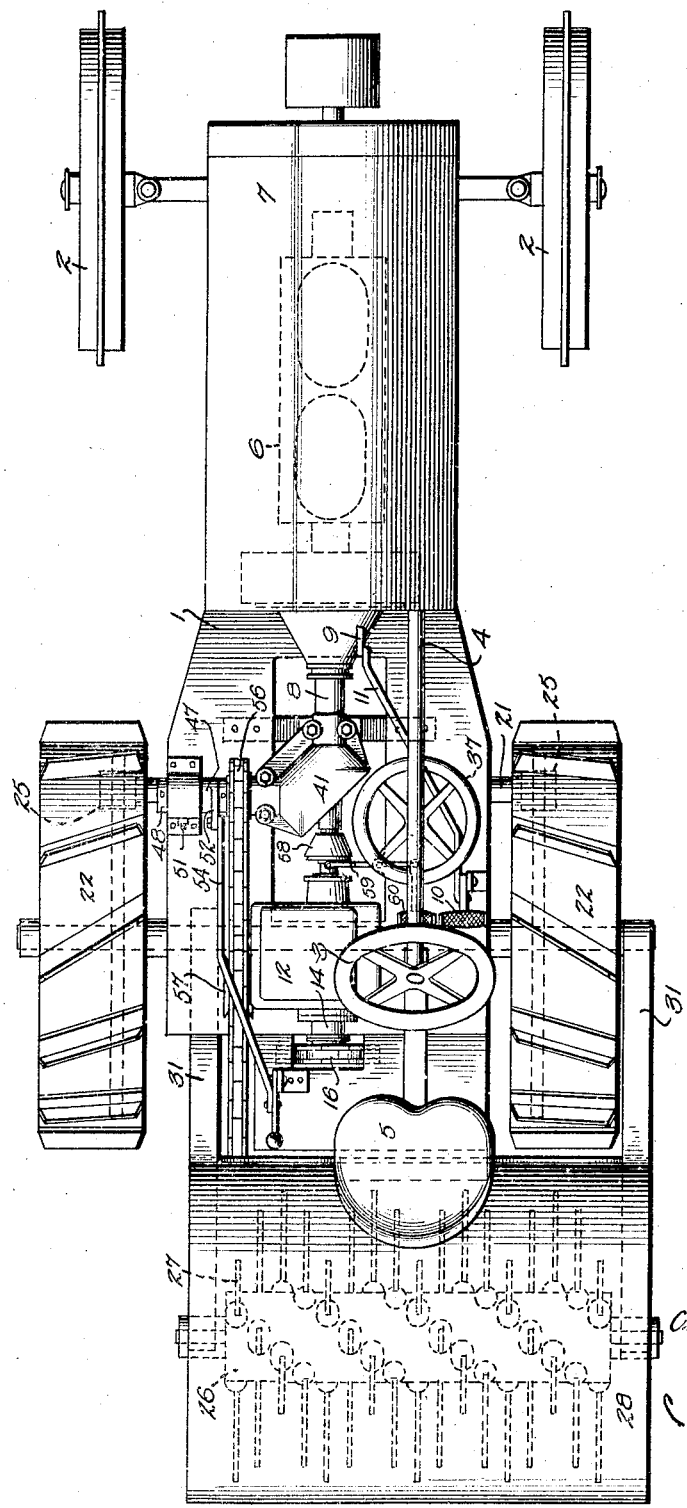

Oct. 15, 1929.   C. F. BURROWS   1,731,332
AGRICULTURAL MACHINE
Filed Sept. 14, 1923    3 Sheets-Sheet 1

Inventor
C.F. Burrows
Attorney

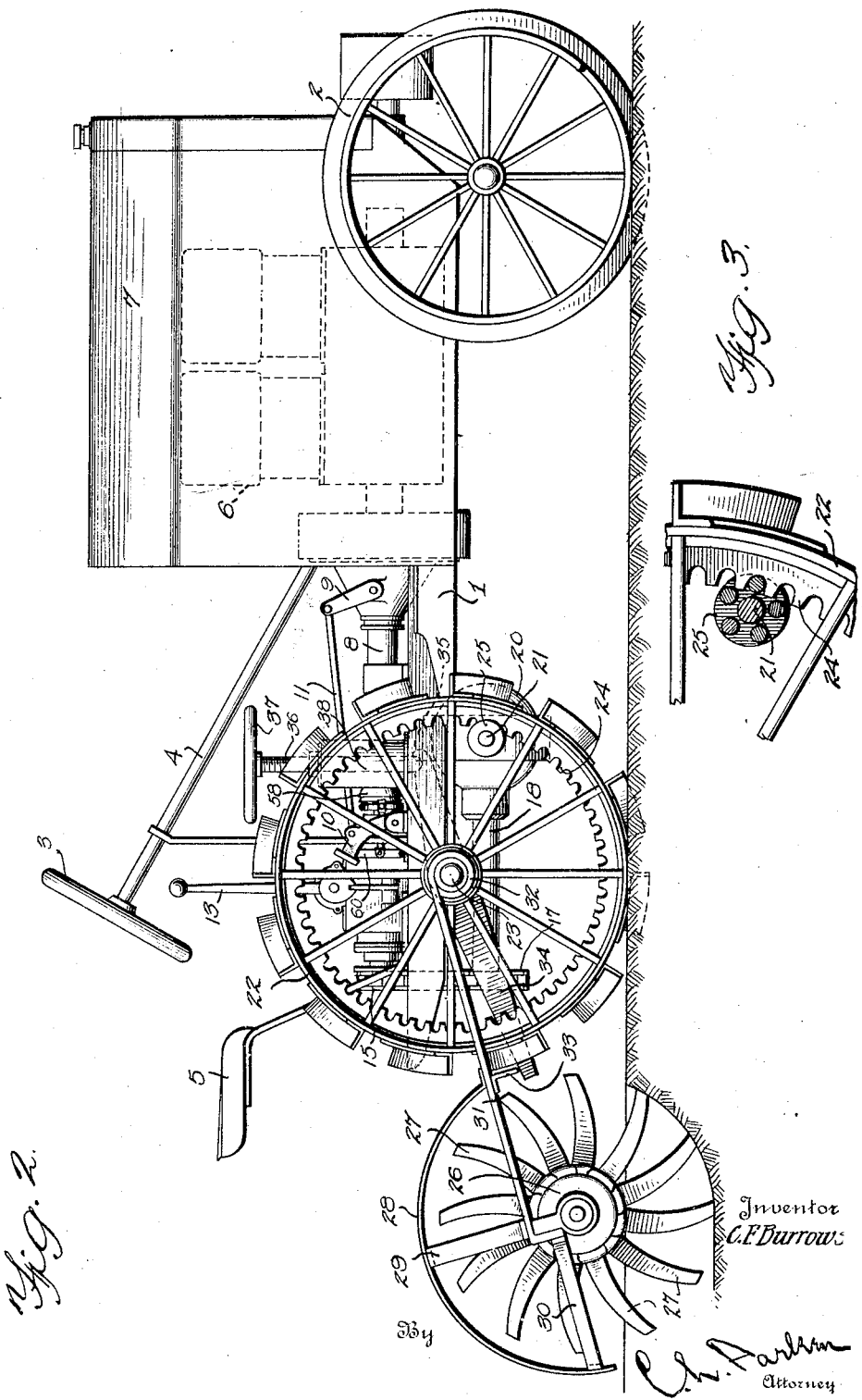

Oct. 15, 1929.  C. F. BURROWS  1,731,332
AGRICULTURAL MACHINE
Filed Sept. 14, 1923  3 Sheets-Sheet 3
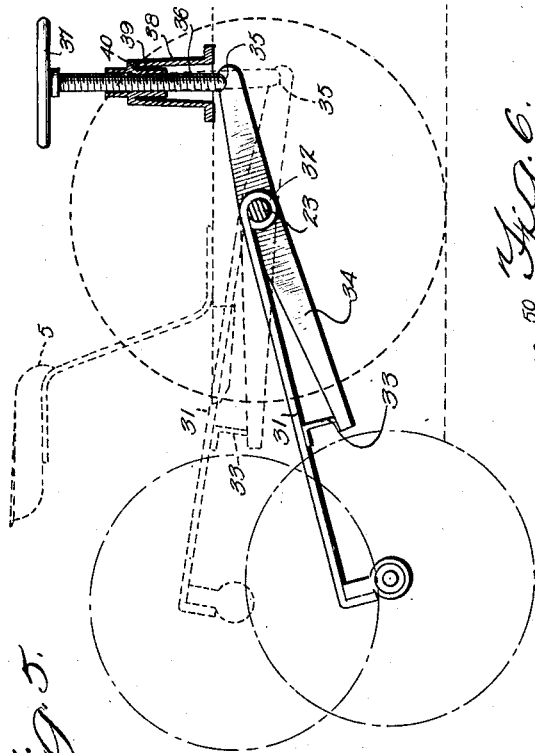
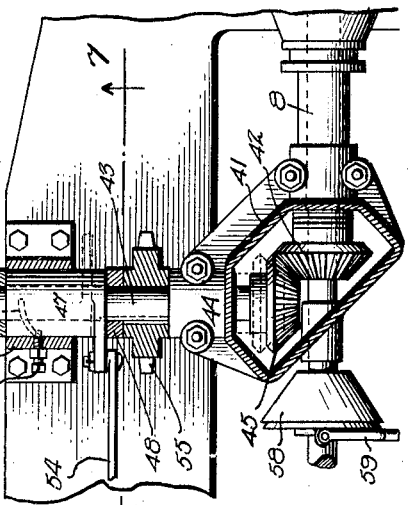
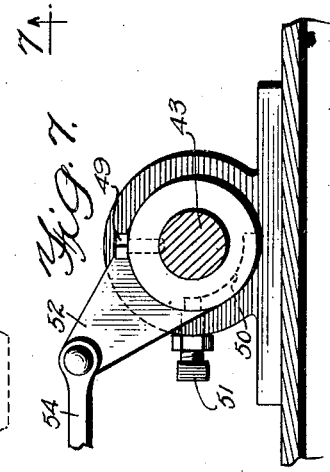
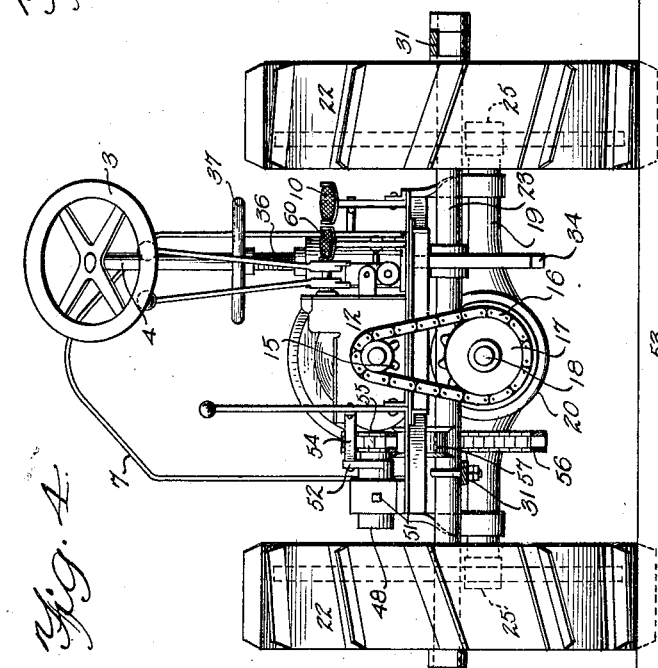
Inventor
C. F. Burrows,
Attorney Patented Oct. 15, 1929

1,731,332

UNITED STATES PATENT OFFICE

CHARLES F. BURROWS, OF JACKSONVILLE, FLORIDA

AGRICULTURAL MACHINE

Application filed September 14, 1923. Serial No. 662,739.

This invention relates to agricultural machines, and more particularly to soil pulverizers.

An object of the invention is the provision of a pulverizing drum carried by a tractor and adapted to be driven from the main shaft of the tractor, independently of the tractor drive.

A further object of the invention is the provision of means for adjustably mounting the pulverizing drum on the rear of a tractor to permit regulation of the depth of the cut.

A further object of the invention is the provision of an improved drive for the pulverizer attachment.

In the accompanying drawings, I have shown one embodiment of the invention. In this showing:

Figure 1 is a plan view, Figure 2 is a side elevation,
Figure 3 is a detail view of a portion of one of the rear wheels of the tractor, showing the drive mechanism,
Figure 4 is a rear elevation of a tractor with the pulverizing attachment removed,
Figure 5 is a detail view of the pulverizer adjusting mechanism,
Figure 6 is a horizontal sectional view showing the drive mechanism for the pulverizing attachment,
Figure 7 is a detail sectional view on line 7—7 of Figure 6, and,
Figure 8 is a perspective view of a cam sleeve forming a part of the pulverizing attachment drive mechanism.

Referring to the drawings, the reference numeral 1 designates generally, the frame of a tractor having front wheels 2. The tractor is provided with suitable steering mechanism (not shown) connected to the front wheels and controlled from a steering wheel 3, mounted on a steering post 4. An operator's seat 5 is arranged adjacent the steering wheel. The tractor is provided with an engine 6, which may be of any desired type and is arranged beneath a hood 7 in the usual manner. A drive shaft 8 is connected to the engine by means of a clutch (not shown) one portion of which is carried by the drive shaft and the other portion by the engine shaft. As shown, the clutch is adapted to be controlled by a lever 9, connected to a clutch pedal 10 through the medium of a link 11. The drive shaft extends rearwardly to a transmission gearing mounted in a gear casing 12. As the transmission gearing is of the usual type employed in motor vehicles, a detail description thereof is deemed unnecessary. This gearing is controlled by a lever 13, arranged adjacent the driver's seat. A driven shaft 14 extends from the rear of the transmission casing and this shaft is provided with a sprocket wheel 15. This wheel is adapted to receive a chain 16, passing over a sprocket wheel 17 on a shaft 18, arranged longitudinally of the tractor and beneath the shaft 14. The shaft 18 is supported in suitable bearings arranged on the frame of the machine and extends into an axle housing 19. As shown, the central portion of the axle housing forms a differential gear casing 20, adapted to receive the ordinary type of differential gearing. A shaft 21 is arranged in the axle housing and extends beyond the ends of the housing. As shown, the tractor is provided with rear wheels 22, mounted on a stationary axle 23, and free to revolve thereon. Each of the wheels is provided with an internal ring gear 24. The shaft 21 is arranged adjacent these wheels and is provided with a gear 25 on each end adapted to mesh with the ring gears 24.

The soil pulverizer consists of a drum 26 having a plurality of blades 27 extending therefrom. A substantially semi-cylindrical cover 28 is arranged over the drum and is supported by arms 29, arranged at each end of the drum. A second set of arms 30 are secured to the drum and the ends of a frame and these arms are arranged at right angles to the arms 29. These arms are extended, as at 31, and provided with sleeves 32 on their ends, which surround the axle 23 and thus pivotally support the soil pulverizer. The pulverizer is controlled by suitable mechanism arranged on the tractor. As shown, a transverse member 33 connects the extensions 31. A lever 34 is arranged beneath the transverse member 33, the lever being pivotally mounted on the axle. The forward end of the lever is provided with a depression 35, adapted to receive the end of an adjusting screw 36. This adjusting screw is provided with a handle 37 on its upper end and passes through a housing 38, arranged on the frame of the machine. A nut 39 is arranged within the housing and adapted to engage the threads of the screw. The upper end of this nut is rounded, as at 40, to permit the screw to assume a position slightly out of the perpendicular when the position of the recess 35 is changed by the movement of the arm 34.

As stated, the pulverizer is driven independently of the tractor and may be run at a fairly constant rate of speed regardless of any change of speed in the tractor. As shown, a gear housing 41 is arranged over the drive shaft between the clutch and the transmission gearing. A bevel gear 42 is mounted on the drive shaft within this housing. A transverse shaft 43 is mounted in a suitable bearing 44, and is provided with a bevel gear 45. When the shaft is in one position, this gear meshes with the bevel gear 42. The shaft 43 is capable of longitudinal movement to bring the gears 42 and 45 in and out of mesh. As shown, the end of the shaft is arranged in a thrust bearing 46. This bearing is provided with a sleeve 47, which surrounds the shaft and is adapted to move therewith, the shaft, however, being capable of independent rotation in the sleeve. The longitudinal movement of the sleeve and shaft is obtained by means of collars 48 which are mounted on the shaft on each side of the sleeve and secured thereto by set screws 49. The sleeve 47 is provided with an arcuate slot 50, adapted to receive the end of a bolt 51 passing through the bearing 46. One end of the sleeve is provided with a crank portion 52 having an opening 53 in its end for the reception of a control lever 54.

The shaft 43 is provided with a sprocket wheel 55, adapted to receive a chain 56. This chain extends rearwardly and passes over a sprocket wheel (not shown) on the drum to drive the pulverizing drum. The chain may be passed over an idler pulley 57, which serves as a guide.

The drive shaft is provided with a clutch 58 arranged between the transmission housing and the gear housing 41 to permit the transmission to be disconnected for the purpose of shifting gears without disconnecting the pulverizer from the source of power. As shown, the clutch is controlled by a lever 59, pivotally mounted on the frame of the machine and connected to a foot pedal 60.

The operation of the device will be apparent from the foregoing description. The rear wheels are driven from the engine through the drive shaft 8, transmission gearing and shaft 14. This drives the shaft 18 through the provision of sprocket wheels 15 and 17 and sprocket chain 16. The differential gearing is driven by the shaft 18 which drives the shaft 21 and thus drives the wheels through the ring gear 24, and the pinions 25. The wheels 22 are free to revolve on the axle 23.

The pulverizing attachment is controlled through the lever 54 which moves the sleeve transversely of the machine and thus moves the shaft 43 to bring the gears 42 and 45 in and out of mesh when desired. When the lever 54 is moved in either direction, the sleeve 47 is revolved through the provision of a crank portion 52. When the sleeve is revolved, the end of the screw 51 rides in the arcuate slot 50 to move the sleeve transversely. When the sleeve is moved transversely, it bears against one of the collars 48 and moves the shaft 43 with it.

The soil pulverizer is pivotally mounted on the rear axle and normally tends to assume a lowered position. This normal tendency is limited by the lever 34 which rests beneath the transverse member 33 and this supports the pulverizing drum. The drum may be raised or lowered by revolving the screw 36.

When the entire apparatus is to be brought to a state of rest, the clutch connecting the drive shaft 8 to the engine shaft is disconnected by depressing the clutch pedal 10. This disconnects the shaft 8 from the source of power forwardly of the housing 41 and thus disconnects both the traction wheels and the soil pulverizer. In the operation of the device, it is frequently necessary to shift the gears of the transmission housing and in order to permit the driven mechanism to be disconnected from the source of power without stopping the pulverizer, the clutch 58 is disengaged by depressing the pedal 60. It will be apparent that if the clutch forwardly of the gear housing were employed for this purpose, not only the transmission housing but the pulverizer also would be disconnected from the source of power, making it necessary to bring the speed of the soil pulverizer up to the desired point after the gears were shifted. By providing the clutch 58 rearwardly of the point where the power for the soil pulverizer is taken from the drive shaft, it is possible to shift the gears in the transmission housing 12 without interfering with the normal operation of the soil pulverizer.

It is to be understood that the form of my invention herewith shown and described is to be taken as a preferred example of the same, and that various changes in the shape, size, and arrangement of parts may be resorted to without departing from the spirit of the invention or the scope of the subjoined claim.

Having thus described my invention, I claim:

In a power take-off for motor vehicles having an engine, a longitudinally extending drive shaft, and a transmission, a clutch arranged in said drive shaft adjacent said transmission, a gear casing surrounding said drive shaft between said engine and said clutch and including a bearing receiving said drive shaft, a bevel gear carried by said drive shaft and arranged in said casing, a laterally extending power shaft arranged substantially at right angles to said drive shaft and extending into said casing, said casing being provided with a bearing rotatably supporting said power shaft, a bevel gear carried by said power shaft and arranged in said casing, power take-off means driven by said power shaft and arranged outwardly of said casing, and means for effecting axial movement of said power shaft to move said gears into and out of registration with each other.

In testimony whereof, I affix my signature.

CHARLES F. BURROWS.